3,032,531
HIGH TEMPERATURE RADIATION RESISTANT SILICONE RUBBER
John C. Saylor, Midland, Mich., assignor to Dow Corning Corporation, Midland, Mich., a corporation of Michigan
No Drawing. Filed June 1, 1959, Ser. No. 817,024
2 Claims. (Cl. 260—46.5)

This invention relates to organopolysiloxane-based rubber having good radiation resistance even at temperatures above 200° C.

This invention is the culmination of a search for an organopolysiloxane gum which when cured has good radiation resistance which does not seriously degrade at high temperatures.

The invention relates to a siloxane copolymer consisting essentially of from 3 to 35 mol percent diphenylsiloxane units and from 65 to 97 mol percent phenylmethylsiloxane units.

Only these copolymers produce cured stocks having both good radiation resistance and elastomeric properties at high temperatures. If less than 3 mol percent diphenylsiloxane units are present, the high temperature radiation resistance of the resulting rubber is highly inferior even though the room temperature radiation resistance is satisfactory. If more than 35 mol percent diphenylsiloxane units are present, the cured product is more waxy than elastomeric. If desired, vinylsiloxane units, preferably no more than 1 mol percent, can be present in the copolymer as endblocking units, e.g. MePhViSiO$_{.5}$, Me$_2$ViSiO$_{.5}$ or Ph$_2$ViSiO$_{.5}$, or as units along the polymer chains, e.g. MeViSiO or PhViSiO, to facilitate vulcanization of the gum, but too many of these units adversely affect the radiation resistance of the cured product. Such vinyl siloxane compositions are within the scope of the claims of the invention.

The copolymers are best prepared by heating together (PhMeSiO)$_4$ and (Ph$_2$SiO)$_4$ or the corresponding cyclic trimers in the desired proportions in the presence of any common alkali siloxane polymerization catalyst. Any vinylsiloxane units can be incorporated by including in the starting mixture the appropriate disiloxane, e.g. (PhMeViSi)$_2$O, (Me$_2$ViSi)$_2$O or (Ph$_2$ViSi)$_2$O, or cyclic trisiloxane, e.g. (PhViSiO)$_3$ or (MeViSiO)$_3$. Other endblocking units such as Ph$_3$SiO$_{.5}$ or Ph$_2$MeSiO$_{.5}$ can also be similarly introduced if desired.

The catalyst is preferably an alkali metal silanolate, such as Me$_3$SiONa, or a low molecular weight siloxanolate, such as KOSiMe$_2$OSiMe$_2$OK. The amount of catalyst can range from one alkali atom per 200,000 silicon atoms to one alkali atom per 100 silicon atoms, but the preferable range is one alkali atom per from 1,000 to 20,000 silicon atoms. The conditions of time and temperature for this copolymerization can be varied widely, but 24 hours at 150° C. has been found to be satisfactory.

The resulting copolymers can be vulcanized with any of the standard heat-peroxide cures employing such agents as ditertiarybutyl peroxide, dibenzoyl peroxide, dicumyl peroxide and tertiarylbutyl perbenzoate. Generally, from 0.5 to 4 parts by weight of peroxide per 100 parts by weight of copolymer is sufficient, but more or less can be used if desired. The conditions of time and temperature for vulcanizing the copolymers of this invention vary to some degree with the peroxide employed but generally no more than one hour at 185° C. is necessary in any case.

The copolymers of this invention can be filled, if desired, with any of the common fillers for siloxane elastomers, Such fillers includes carbon black, metallic oxides such as titania, ferric oxide, zinc oxide and the like, fibrous fillers such as asbestos and glass, and siliceous fillers such as diatomaceous earth and crushed quartz. However, it is preferred that the fillers include any of the well known reinforcing silica fillers, e.g. fume silicas, silica aerogels and precipitated silicas, having a surface area greater than 50 square meters per gram. These fillers, if desired, can have organosilyl groups attached to the surface thereof. All of these fillers are well known in the art. From 20 to 200 parts, but generally from 20 to 80 parts, of the reinforcing silica fillers are employed per 100 parts of siloxane while up to 400 parts of other fillers can be employed.

The copolymers of this invention are useful for making rubbers which are resistant to "radiation" such as gamma radiation, X-rays, accelerated electrons, neutrons and beta particles even at temperatures of 200° C. and above. Such radiation resistant rubber is useful as gasketing or insulation in sealed systems such as pumps or motors which are exposed to radiation but which cannot be easily cooled or maintained. Such rubber is also useful for gasketing around observation windows in otherwise radiation proof walls.

The following examples are merely illustrative of preferred methods of practicing this invention and are not intended to limit the invention which is delineated in the claims. In these examples as well as in the rest of this specification Me is the methyl radical, Ph is the phenyl radical and Vi is the vinyl radical.

EXAMPLE 1

The following diphenylsiloxane-phenylmethylsiloxane-methylvinylsiloxane copolymers were prepared by heating together for 24 hours at 150° C. (PhMeSiO)$_4$, (Ph$_2$SiO)$_4$ and (MeViSiO)$_3$ in the amounts equivalent to the mol percentages of the respective siloxane units in the final copolymers. The catalyst employed was Me$_3$SiONa in an amount equivalent to 1 sodium atom per 10,000 silicon atoms. The Williams plasticity in inches of each of the final copolymers is shown.

Table

| Mol Percent in Copolymer | | | Plasticity |
| --- | --- | --- | --- |
| PhMeSiO | Ph$_2$SiO | MeViSiO | |
| 96.5 | 3 | 0.5 | 0.100 |
| 90 | 10 | | 0.113 |
| 84.5 | 15 | 0.5 | 0.140 |
| 74.5 | 25 | 0.5 | 0.120 |
| 69.5 | 30 | 0.5 | 0.130 |

EXAMPLE 2

Two copolymers prepared as in Example 1, copolymer A consisting of 96.5 mol percent phenylmethylsiloxane units, 3 mol percent diphenylsiloxane units and 0.5 mol percent methylvinylsiloxane units and copolymer B consisting of 84.5 mol percent phenylmethylsiloxane units, 15 mol percent diphenylsiloxane units and 0.5 mol percent methylvinylsiloxane units, were each compounded into rubber stocks employing 30 parts by weight of a fume silica and 1 part by weight of ditertiarybutyl peroxide per 100 parts by weight of copolymer. These stocks were press-cured for 30 minutes at from 175 to 185° C.

These elastomers were exposed to gamma radiation until the elongation of each elastomer was reduced 50% from its initial elongation. The total dosages were noted. The elastomer employing copolymer A required a dosage of approximately 88 megarads. The elastomer employing copolymer B required a dosage of approximately 160 megarads.

EXAMPLE 3

A copolymer of 80 mol percent phenylmethylsiloxane units and 20 mol percent diphenylsiloxane units was prepared as follows. A phenylmethylpolysiloxane hydrolyzate containing 5 percent by weight silicon-bonded hydroxyl groups and diphenylsilanediol in a molar proportion of approximately 4 phenylmethylsiloxane units for each mol of diphenylsilanediol were mixed with $$NaOSiMe_2OSiMe_2ONa$$

in an amount equal to one sodium atom per 2,500 silicon atoms. The mixture was heated gradually at an absolute pressure of less than 100 mm. Hg over a 4 hour period up to a temperature of 150° C. with 20 hours additional heating at 150° C. Cyclic siloxanes were solvent-extracted from the resulting gum. The product was found to be the desired copolymer with a Williams plasticity of approximately 0.180 inch.

100 parts of this copolymer were milled with 30 parts of a fume silica and 1 part of di-benzoylperoxide. This rubber stock was press-cured for 5 minutes at 125° C. The resulting elastomer shows excellent resistance to radiation.

Radiation resistant silicone elastomers are obtained when a copolymer of 90 mol percent phenylmethylsiloxane units and 10 mol percent diphenylsiloxane units or a copolymer of 15 mol percent diphenylsiloxane units, 84.3 mol percent phenylmethylsiloxane units and 0.7 mol percent phenylvinylsiloxane units is employed in the above rubber stock formulation.

EXAMPLE 4

When 100 parts by weight of a gum copolymer of 69.5 mol percent phenylmethylsiloxane units, 30 mol percent diphenylsiloxane units and 0.5 mol percent methylvinylsiloxane units are milled with 30 parts by weight of a silica xerogel of the type described in copending application Serial No. 460,770, filed October 6, 1954, by William H. Daudt and 3 parts by weight of dicumyl peroxide and the stock is press-cured for 30 minutes at 150° C., the resulting silicone elastomer has excellent resistance to gamma radiation and accelerated electrons.

That which is claimed is:

1. A vulcanizable composition consisting essentially of a gum copolymer consisting essentially of from 3 to 35 mol percent diphenylsiloxane units, from 65 to 97 mol percent phenylmethylsiloxane units and no more than 1 mol percent siloxane units selected from the group consisting of methylphenylvinylsiloxane units, dimethylvinylsiloxane units, diphenylvinylsiloxane units, methylvinylsiloxane units and phenylvinylsiloxane units, an inorganic filler and an organic peroxide vulcanizing agent.

2. A silicone elastomeric material of improved radiation resistance consisting essentially of a cured copolymer of from 3 to 35 mol percent diphenylsiloxane units, from 65 to 97 mol percent phenylmethylsiloxane units and no more than 1 mol percent siloxane units selected from the group consisting of methylphenylvinylsiloxane units, dimethylvinylsiloxane units, diphenylvinylsiloxane units, methylvinylsiloxane units and phenylvinylsiloxane units, said copolymer consisting essentially of carbon, hydrogen, oxygen and silicon atoms, and an inorganic filler.

References Cited in the file of this patent
UNITED STATES PATENTS

| 2,258,222 | Rochow | Oct. 7, 1941 |
| 2,480,620 | Warrick | Aug. 30, 1949 |

FOREIGN PATENTS

| 790,182 | Great Britain | Feb. 5, 1958 |

OTHER REFERENCES

Chemical Abstracts, vol. 51, 8549a (1957).